Nov. 3, 1936.   G. A. ELLESTAD   2,059,781

MICROSCOPE ILLUMINATOR

Filed Aug. 21, 1934

Gerhard A. Ellestad
INVENTOR

Patented Nov. 3, 1936

2,059,781

UNITED STATES PATENT OFFICE 2,059,781

MICROSCOPE ILLUMINATOR

Gerhard A. Ellestad, Rochester, N. Y., assignor to Bausch & Lomb Optical Company, Rochester, N. Y., a corporation of New York Application August 21, 1934, Serial No. 740,792

9 Claims. (Cl. 88—40)

This invention relates to microscopes and more particularly it has reference to means for illuminating an object which is viewed or photographed through a microscope.

One of the objects of my invention is to provide simple, yet efficient and convenient, means for illuminating objects which are viewed or photographed through a microscope. Another object is to provide improved means for supporting the objective in cooperative relation with the reflector of a microscope illuminator. These and other objects and advantages reside in certain novel features of construction, arrangement and combination of parts as will hereinafter be more fully described and pointed out in the appended claims.

Referring to the drawing.

Figure 1:
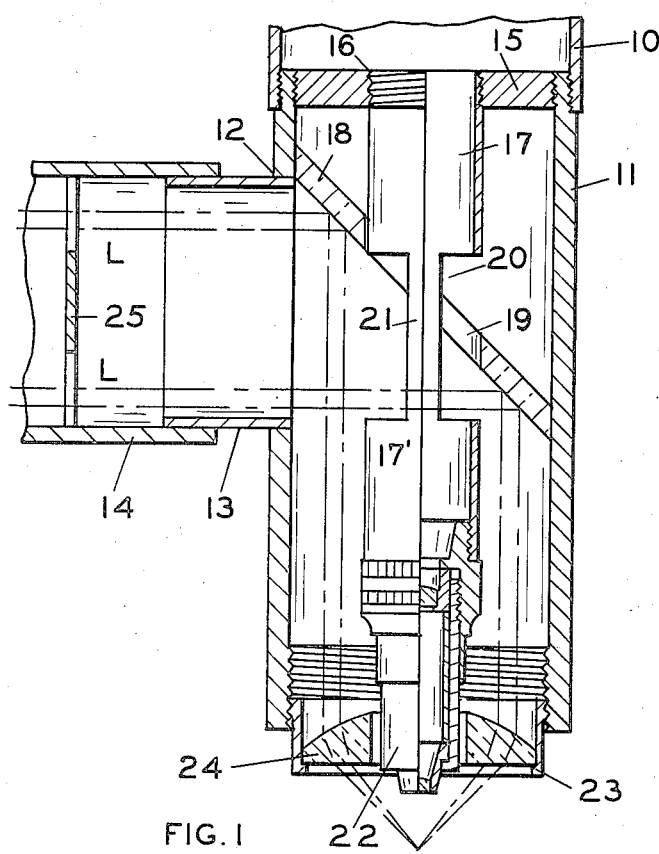
Fig. 1 is a vertical sectional view of an illuminator embodying my invention.
Figure 2:
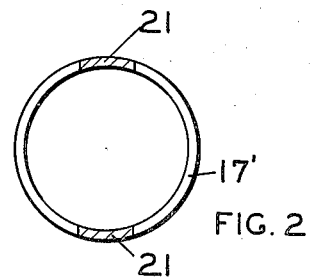
Fig. 2 is a horizontal section through the objective supporting tube.

A preferred embodiment of my invention is illustrated in the drawing wherein 10 indicates the lower portion of the body tube of a microscope. Detachably secured thereto, as by threads, is the tubular casing 11 having a lateral opening 12 in which are mounted the telescoping tubes 13 and 14. At its upper end the casing 11 carries a plate 15 provided with a central aperture 16 into which is threaded a tubular member 17. Mounted within the casing 11, by any suitable means, is the inclined reflector 18 having a centrally disposed aperture 19 through which tubular member 17 extends.

At a point adjacent to the aperture 19 the tubular member is cut away as at 20 so that the lower part 17' of the tubular member is suspended by two spaced parts 21 of the side wall. The lower end of the part 17' is threaded to receive the usual microscope objective 22. The lower end of casing 11 is threaded to receive a mounting 23 carrying an annular condensing lens 24 which surrounds the objective and may be adjusted to properly focus the light rays on the object.

In operation, light rays L from a laterally positioned source, not shown, pass through tubes 13 and 14 and strike the reflector 18. Tube 14 carries a centrally disposed opaque stop 25 so that light rays do not pass to the aperture 19. From the reflector the light rays pass down to the condensing lens 24 and are focused on the object.

Since the supporting parts 21 are spaced and of a relatively small dimension they offer practically no obstruction to the free passage of the light rays to the reflector. As shown in Fig. 1, the tubular member 17 should be so positioned that the smallest dimension, the wall thickness, is visible from the side at which the light source is positioned. The tube 17 should, of course, be constructed of such material that the members 21 will be of ample strength and rigidity without being of such dimensions as to interfere seriously with the free passage of light rays to the reflector.

Figure 3:
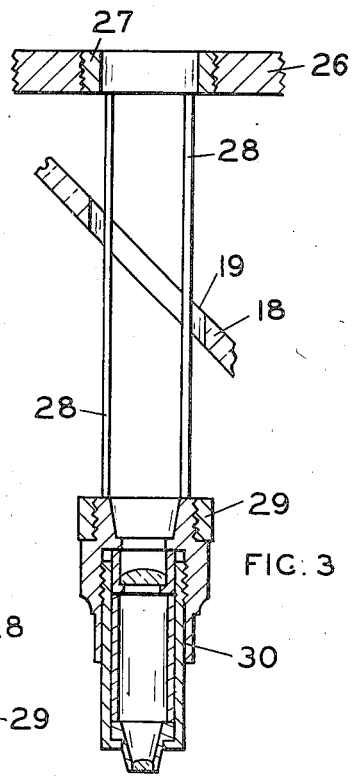
Fig. 3 is a sectional view of a modified objective support.
Figure 4:
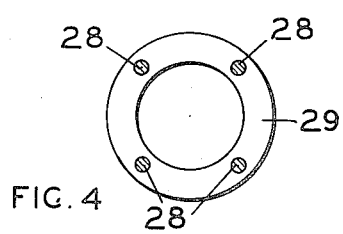
Fig. 4 is a horizontal section through the modified objective support.

In the modification shown in Figs. 3 and 4, the plate 26, adapted to be secured to casing 11, carries a bushing 27 to which are secured the four depending rods 28 which support a collar 29 to which is threaded the microscope objective 30. The rods 28 are preferably positioned in aligned pairs so that the only obstacle presented to the laterally directed light rays, as they pass to the reflector, will be the thickness of two spaced rods 28. The rods 28 are, of course, made of a material affording ample strength and rigidity while still keeping the dimension of the rods down to a minimum.

From the foregoing, it will be apparent that I am able to attain the objects of my invention and provide an improved illuminator for microscopes. Although I have shown my illuminator attached to the lower end of a body tube of a microscope, it could also be used in inverted form such as on a metallographic microscope, for example. Various microscope objectives of different focal lengths can be readily attached or removed from the illuminator and the light rays for illuminating the object can be focused by varying the position of the condensing lens 24. The device is relatively simple in construction yet efficient and convenient in operation. Various modifications can obviously be made without departing from the spirit of my invention.

I claim:

1. An illuminator for microscopes comprising a support, an inclined reflector carried by said support, said reflector having a central aperture, supporting means carried by said support extending through said aperture, and an objective carried by said means, the construction of said means adjacent to said reflector being of relatively small dimension such that a substantially unimpeded path is provided whereby light rays may strike said reflector and be directed downwardly on all sides of the objective.

2. An illuminator of the type described comprising a body, a casing secured to said body and having a lateral opening, an inclined reflector mounted within the casing opposite said opening, said reflector having an aperture, supporting means carried by said body and extending through said aperture, an objective mounted on said means below said reflector and light directing means surrounding said objective.

3. An illuminator of the type described comprising a support, a casing carried by said support and having a lateral opening, an inclined reflector mounted within the casing opposite the opening, said reflector having a centrally disposed aperture, spaced members carried by said support and projecting through said aperture, an objective carried by said members and light condensing means surrounding the objective, said members being of relatively small dimension so that light rays directed toward said reflector from said opening will be substantially unimpeded.

4. In an illuminator for microscopes, the combination of a casing having an opening adapted to be secured to the body tube of a microscope, an inclined reflector mounted within the casing, said reflector having a centrally disposed aperture, a tube extending downwardly from said body tube through said aperture, said tube having cut-away portions in alignment with said reflector and an objective mounted on the lower end of said tube, whereby light rays directed toward said reflector from said opening will be substantially unimpeded.

5. An illuminator for microscopes comprising a casing having a lateral opening, an inclined reflector mounted in said casing, said reflector having a central aperture opposite said opening, a tubular member carried by said casing, said member extending through said aperture, an objective carried by said member and light directing means surrounding said objective, said member being cut away adjacent to said aperture to provide a plurality of spaced parts of relatively small dimension whereby light rays directed toward said reflector from said opening will be substantially unimpeded.

6. In an illuminator for microscopes, the combination of a body tube, a reflector positioned below said tube, said reflector having an aperture, supporting means carried by said body tube, said means extending through said aperture and comprising a plurality of spaced members of relatively small dimension, and an objective mounted on said means below said reflector.

7. An illuminator for microscopes comprising a casing, an inclined reflector mounted within the casing, said reflector having an aperture, supporting means carried by said casing, said means extending through said aperture, the part of said means positioned within and adjacent to said aperture comprising spaced members having relatively small dimensions, means positioned laterally of said reflector for directing light rays onto said reflector, and an objective carried by said supporting means below said reflector.

8. In an illuminator for microscopes, the combination of a body tube, a casing secured to the body tube, an inclined reflector mounted within said casing, said reflector having an aperture, supporting means carried by said body tube, said supporting means extending through said aperture, attaching means on said supporting means, an objective having attaching means cooperating with said first named attaching means whereby said objective is carried by said supporting means, and means for directing light rays onto said reflector and thence to an object located beneath said objective.

9. An illuminator for a microscope having a body tube comprising an inclined reflector having a central aperture, said reflector being positioned so that the axis of the body tube passes through said aperture, supporting means carried by said body tube, said means extending down through said aperture, an objective carried by said means below said reflector, laterally disposed means for directing light rays onto said reflector and thence downwardly onto an object beneath said objective, the portion of the supporting means positioned within and adjacent to said aperture being of a relatively small dimension whereby the illumination on the object will be substantially uniform.

GERHARD A. ELLESTAD.